United States Patent
Fang et al.

(10) Patent No.: US 11,509,655 B2
(45) Date of Patent: Nov. 22, 2022

(54) AUTHENTICATION SYSTEM AND AUTHENTICATION METHOD

(71) Applicants: Yao-Te Fang, Hsinchu (TW); Ming-Hsun Sung, Hsinchu County (TW)

(72) Inventors: Yao-Te Fang, Hsinchu (TW); Ming-Hsun Sung, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 200 days.

(21) Appl. No.: 16/894,889

(22) Filed: Jun. 8, 2020

(65) Prior Publication Data

US 2020/0389455 A1    Dec. 10, 2020

(30) Foreign Application Priority Data

Jun. 10, 2019   (TW) .................................. 108119975
May 20, 2020   (TW) .................................. 109116734

(51) Int. Cl.
*H04L 29/06* (2006.01)
*H04L 9/40* (2022.01)
(Continued)

(52) U.S. Cl.
CPC .......... *H04L 63/0884* (2013.01); *G06F 21/44* (2013.01); *H04L 9/0643* (2013.01);
(Continued)

(58) Field of Classification Search
CPC ............. H04L 63/0884; H04L 9/0643; H04W 12/041; G06F 21/44
See application file for complete search history.

(56) References Cited

U.S. PATENT DOCUMENTS 9,602,508 B1    3/2017  Mahaffey et al.
2018/0278612 A1*  9/2018  Pattar .................... H04L 63/061
(Continued)

FOREIGN PATENT DOCUMENTS

CN    105554013    5/2016
WO    2017155703    9/2017

OTHER PUBLICATIONS

Fan, Li, Jiang, et al. "U2F based Secure Mutual Authentication Protocol for Mobile Payment." ACM TUR-C '17, May 12-14, 2017. 6 pages. (Year: 2017).*

*Primary Examiner* — Jason K Gee
(74) *Attorney, Agent, or Firm* — JCIPRNET (57) ABSTRACT

An authentication system and an authentication method are provided. The electronic device of the authentication system includes a controller, a processor and a key module, wherein the processor performs an application program. In a binding phase, the application device generates a digest file according to key factor information and a selection strategy, and stores the digest file in a digest table of the electronic device. In a checking phase, the application program determines whether the controller corresponds to a binding device according to the digest file and the key factor information. If the controller corresponded to the binding device, in an authentication phase, the controller performs an authentication operation of a U2F service with a server device according to the digest file corresponding to the binding device in response to a pressing of the key module.

31 Claims, 8 Drawing Sheets

(51) Int. Cl.
  *H04W 12/06* (2021.01)
  *G06F 21/44* (2013.01)
  *H04L 9/32* (2006.01)
  *H04L 9/06* (2006.01)
  *H04W 12/041* (2021.01)

(52) U.S. Cl.
  CPC .......... *H04L 9/3247* (2013.01); *H04L 63/083* (2013.01); *H04L 63/0861* (2013.01); *H04W 12/041* (2021.01); *H04W 12/06* (2013.01); *H04L 2209/04* (2013.01)

(56) References Cited

U.S. PATENT DOCUMENTS

2019/0036924 A1* 1/2019 Wang .................... H04W 76/10
2020/0084204 A1* 3/2020 Craswell ............. H04L 63/0838

* cited by examiner

FIG. 11

AUTHENTICATION SYSTEM AND AUTHENTICATION METHOD

CROSS-REFERENCE TO RELATED APPLICATION

This application claims the priority benefit of Taiwan application serial no. 108119975, filed on Jun. 10, 2019, and Taiwan application serial no. 109116734, filed on May 20, 2020. The entirety of each of the above-mentioned patent applications is hereby incorporated by reference herein and made a part of this specification.

BACKGROUND

Field of the Disclosure

The disclosure relates to an authentication system and an authentication method, and in particular to an authentication system and an authentication method developed based on Universal 2nd Factor (U2F) protocol established by the FIDO (Fast Identity Online Alliance).

Description of Related Art

With the rapid development of network technology, many important information transmission, commercial transactions or financial transactions are carried out mainly through the Internet. In order to improve the security of the Internet, the authentication method based on Universal 2nd Factor (U2F) protocol has been supported by many websites. However, users have to additionally purchase a physical key device specially designed and manufactured in compliance with the U2F protocol in order to use the authentication service of the U2F protocol supported by the server website through computer. In that case, the user's cost is increased, which consequently decreases the user's willingness to use such an authentication service.

SUMMARY OF THE DISCLOSURE

In view of the foregoing, the disclosure provides an authentication system and authentication method, which not only allows users to use the authentication service of the Universal 2nd Factor (U2F) protocol supported by websites, but also reduces the user's cost for use, thereby improving the user's willingness to use.

An authentication system of the disclosure includes an electronic device. The electronic device includes a controller, a processor and a key module. The controller has a digest table. The processor is coupled to the controller and configured to execute an application program. The key module is coupled to the controller and controlled by the controller. In a binding phase, the application program generates a digest file according to key factor information and stores the digest file in a digest table of the electronic device. In a checking phase, the application program determines whether the controller corresponds to a binding device according to the digest file and the key factor information. If the controller corresponds to the binding device, in an authentication phase, the controller performs an authentication operation of a U2F service with a server device according to the digest file corresponding to the binding device in response to a pressing of the key module.

The authentication method of the disclosure includes the following steps. In the binding phase, the application program executed by the processor of the electronic device generates a digest file according to key factor information and a selection strategy, and stores the digest file in the digest table of the controller of the electronic device. In the checking phase, it is determined, by using the application program of the electronic device, whether the controller corresponds to the binding device based on the digest file and the key factor information. If the controller corresponds to the binding device, in the authentication phase, the controller performs the authentication operation of the U2F service with the server device according to the digest file corresponding to the binding device in response to the pressing of the key module of the electronic device.

Based on the above, the authentication system and the authentication method provided by the disclosure allow the user to use the authentication based on the U2F protocol supported by the server device to improve the security of using the server device service. In addition, the mobile storage device/mobile communication device in the authentication system provided by the disclosure can be any type of existing portable storage device/portable communication device, and the authentication method can be performed by the electronic device. Therefore, the user does not need to additionally purchase a physical key device specially designed and manufactured in compliance with the U2F protocol. In this way, the cost for using authentication based on the U2F protocol can be effectively reduced, thereby increasing the user's willingness to use.

In order to make the above-mentioned features and advantages of the disclosure more comprehensible, the embodiments are specifically described below with reference to the accompanying drawings.

BRIEF DESCRIPTION OF THE DRAWINGS

The following drawings are a part of the specification of the disclosure, and illustrate exemplary embodiments of the disclosure. The drawings together with the description of the specification illustrate the principle of the disclosure.

DESCRIPTION OF EMBODIMENTS

In order to make the content of the disclosure more comprehensible, the following specific embodiments are taken as examples based on which the disclosure can indeed be implemented. In addition, wherever possible, elements/components with the same reference numerals in the drawings and embodiments denote the same or similar components.

Figure 1:
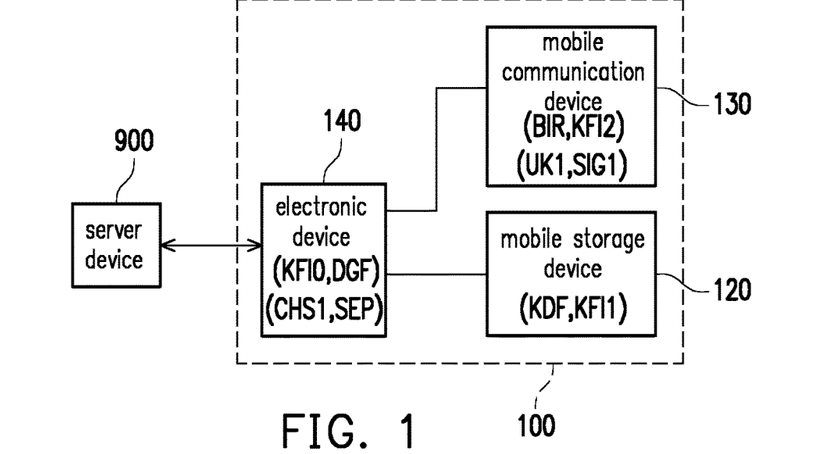
FIG. 1 is a schematic block diagram and application diagram of an authentication system according to an embodiment of the disclosure.

FIG. 1 is a schematic block diagram and application diagram of an authentication system according to an embodiment of the disclosure. Referring to FIG. 1, the authentication system 100 at least includes the electronic device 140, but in other embodiments, the authentication system 100 may further include one of the mobile storage device 120 and the mobile communication device 130.

The mobile storage device 120 is configured to store a key identification file KDF as a physical key device. The electronic device 140 can be plugged into the mobile storage device 120. The electronic device 140 can perform calculations related to Universal 2nd Factor (U2F) according to the key identification file KDF stored in the mobile storage device 120, and can activate the authentication service of the U2F protocol supported by the server device 900 in response to the pressing of the key module of the electronic device 140, such that the user of the electronic device 140 can use the authentication service of the U2F protocol supported by the server device 900.

The mobile communication device 130 is configured to transmit a biometric identification confirmation result BIR, wherein the biometric identification confirmation result BIR is, for example, a face identification result or a fingerprint identification result, but the embodiment of the disclosure is not limited thereto. The electronic device 140 is configured to connect with the mobile communication device 130 in a wired or wireless manner. The electronic device 140 can perform the calculation related to the U2F according to the biometric identification confirmation result BIR provided by the mobile communication device 130, and can activate the authentication service of the U2F protocol supported by the server device 900 in response to the pressing of the key module of the electronic device 140, such that the user of the electronic device 140 can use the authentication service of the U2F protocol supported by the server device 900.

In addition, when the electronic device 140 is not connected to an external electronic device (such as the mobile storage device 120 and the mobile communication device 130), the electronic device 140 can perform a calculation of the U2F based on its own information, and can activate the authentication service of the U2F protocol supported by the server device 900 in response to the pressing of the key module of the electronic device 140, such that the user of the electronic device 140 can use the authentication service of the U2F protocol supported by the server device 900.

Therefore, even if the user's account and password for logging into the server device 900 are obtained by others, as long as the bound interface physical device (such as the electronic device 140) is not obtained by others, or the corresponding authentication physical device (such as the mobile storage device 120 and the mobile communication device 130) are not obtained by others, the login account and password entered by others cannot pass the authentication of the U2F protocol of the server device 900, and therefore cannot log into the user's account.

In an embodiment of the disclosure, the mobile storage device 120 may be, for example, a universal serial bus (USB) flash drive or a combination of a USB card reader and a memory card, and the mobile communication device 130 may be, for example, a mobile phone or a tablet PC, but the disclosure is not limited thereto. In fact, the mobile storage device 120 can be any type of existing portable storage device, and the mobile communication device 130 can be any type of existing portable communication device, so the user's cost for use can be reduced.

In an embodiment of the disclosure, the electronic device 140 may be, for example, a notebook computer, but the disclosure is not limited thereto.

In an embodiment of the disclosure, the electronic device 140 can communicate with the server device 900 through wired communication or wireless communication.

In an embodiment of the disclosure, the authentication process of the authentication system 100 may include a binding phase, a checking phase, and an authentication phase, but is not limited thereto. In the binding phase, the electronic device 140 that is configured to perform the authentication of the U2F protocol can be bound, and one of the mobile storage device 120 and the mobile communication device 130 can further be bound to the electronic device 140. When the electronic device 140 is plugged into the mobile storage device 120, at the binding phase, the electronic device 140 can generate a key identification file KDF according to the key factor information KFI0 of the electronic device 140, and transmit the key identification file KDF to the mobile storage device 120. In addition, during the binding phase, the electronic device 140 can generate a digest file DGF according to the file status of the key identification file KDF and the key factor information KFI0 of the mobile storage device 120, and store the digest file DGF in the controller of the electronic device 140 (to be described later), wherein the controller stores a digest table. In this way, the mobile storage device 120 and the electronic device 140 are bound to each other by the key identification file KDF and the digest file DGF.

When the electronic device 140 is connected to the mobile communication device 130, at the binding phase, the mobile communication device 130 provides the first public key UK1 and key factor information KFI2 to the electronic device 140, the key factor information KFI2 includes, for example, the account currently logged in by the mobile communication device 130 (such as an e-mail address), the international mobile device identification (IMEI) code of the mobile communication device 130, the phone number of the current user identity module (SIM) card, and the information code randomly generated at the current binding phase by the application program in the mobile communication device 130. In addition, in the binding phase, the electronic device 140 can generate the digest file DGF according to the key factor information KFI2 of the mobile communication device 130 and the key factor information KFI0 of the mobile storage device 120, and store the digest file DGF in the digest table of the electronic device 140. In this way, the mobile communication device 130 and the electronic device 140 are bound to each other by the first public key UK1 and the digest file DGF.

When the electronic device 140 is not connected to an external electronic device, at the binding phase, the electronic device 140 may generate the digest file DGF according to its key factor information KFI0, and store the digest file DGF in the digest table of the electronic device 140 to pretend to be bound to a virtual device.

In addition, when the electronic device 140 is plugged into the mobile storage device 120, in the checking phase, the electronic device 140 may check whether the mobile storage device 120 and the electronic device 140 are bound to each other. In detail, the electronic device 140 can read the key identification file KDF from the mobile storage device 120, and check whether the key identification file KDF in the mobile storage device 120 is valid according to the digest file DGF and the key factor information KFI0 of the electronic device 140. If the electronic device 140 verifies that the key identification file KDF is valid, it means that the mobile storage device 120 and the electronic device 140 have been bound to each other, that is, it is determined that the electronic device 140 corresponds to the binding device (that is, the mobile storage device 120), then in the authentication phase, the electronic device 140 may perform the authentication operation of the U2F service with the server device 900 according to the digest file DGF corresponding to the key identification file KDF.

When the electronic device 140 is connected to the mobile communication device 130, at the checking phase, the electronic device 140 can check whether the mobile communication device 130 and the electronic device 140 are bound to each other. In detail, the mobile communication device 130 can receive the first authentication query CHS1 from the electronic device 140, and return a first signature SIG1 to the electronic device 140 according to the first authentication query CHS1, then the electronic device 140 verifies whether the first signature SIG1 corresponds to the first public key UK1 to determine whether the mobile communication device 130 is a binding device. If the mobile communication device 130 is a binding device, the electronic device 140 can perform the authentication operation of the U2F service with the server device 900 according to the digest file DGF corresponding to the mobile communication device 130.

When the electronic device 140 is not connected to an external electronic device, in the checking phase, the electronic device 140 can determine whether the electronic device 140 corresponds to a binding device (here a virtual device) according to the key factor information KFI0. Generally speaking, the electronic device 140 is determined to correspond to the binding device, and then the electronic device 140 can perform the authentication operation of the U2F service with the server device 900 according to the digest file DGF.

In an embodiment of the disclosure, the authentication process of the authentication system 100 may further include a registration phase. In detail, if the electronic device 140 is determined to correspond to the binding device, then at the registration phase, the electronic device 140 may register with the server device 900 for the U2F service according to the corresponding digest file DGF. As long as the electronic device 140 completes the registration for the U2F service with the server device 900 according to the digest file DGF, then at the authentication phase, the authentication of the U2F service performed by the electronic device 140 according to the corresponding digest file DGF with respect to the server device 900 can be passed.

Figure 2:
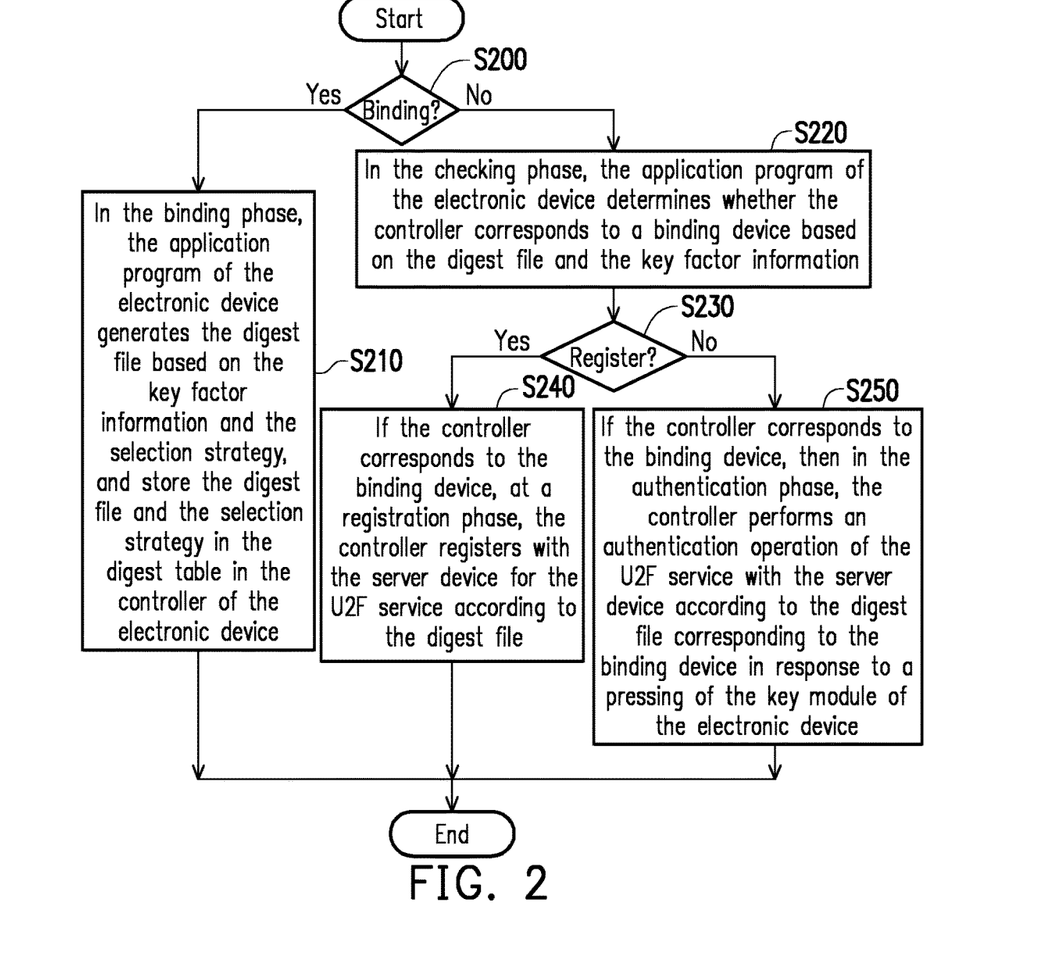
FIG. 2 is a flowchart of steps of an authentication method according to an embodiment of the disclosure.

FIG. 2 is a flowchart of steps of an authentication method according to an embodiment of the disclosure. Please refer to FIG. 1 and FIG. 2 together. The authentication method in this exemplary embodiment includes the following steps. First, regardless of whether the mobile storage device 120 is plugged into the electronic device 140 or whether the mobile communication device 130 is connected to the electronic device 140, the user can decide whether to make the electronic device 140 to bind to an external device (such as the mobile storage device 120 or mobile communication device 130) or a virtual device, as shown in step S200. If the decision result of step S200 is yes, then step S210 is performed, otherwise step S220 is performed. In the binding phase shown in step S210, the application program of the electronic device 140 is utilized to generate the digest file DGF based on the key factor information KFI0 (or one of the key factor information KFI1 and KFI2) and the selection strategy SEP, and store the digest file DGF and the selection strategy SEP in the digest table in the controller of the electronic device 140.

In addition, in the checking phase shown in step S220, the application program of the electronic device 140 is utilized to determine whether the controller of the electronic device 140 corresponds to the binding device according to one of the digest file DGF and the key factor information KFI0, KFI1 and KFI2. If the controller of the electronic device 140 corresponds to the binding device, it is determined whether to register with the server device 900 for the U2F service, as shown in step S230. If the decision result of step S230 is yes, then at the registration phase shown in step S240, the electronic device 140 registers with the server device 900 according to the digest file DGF. If the decision result of step S230 is no, then in the authentication phase shown in step S250, the controller of the electronic device 140 is utilized to perform the authentication operation of the U2F service with the server device 900 according to the digest file DGF of the binding device in response to the pressing of the key module of the electronic device 140.

Figure 3:
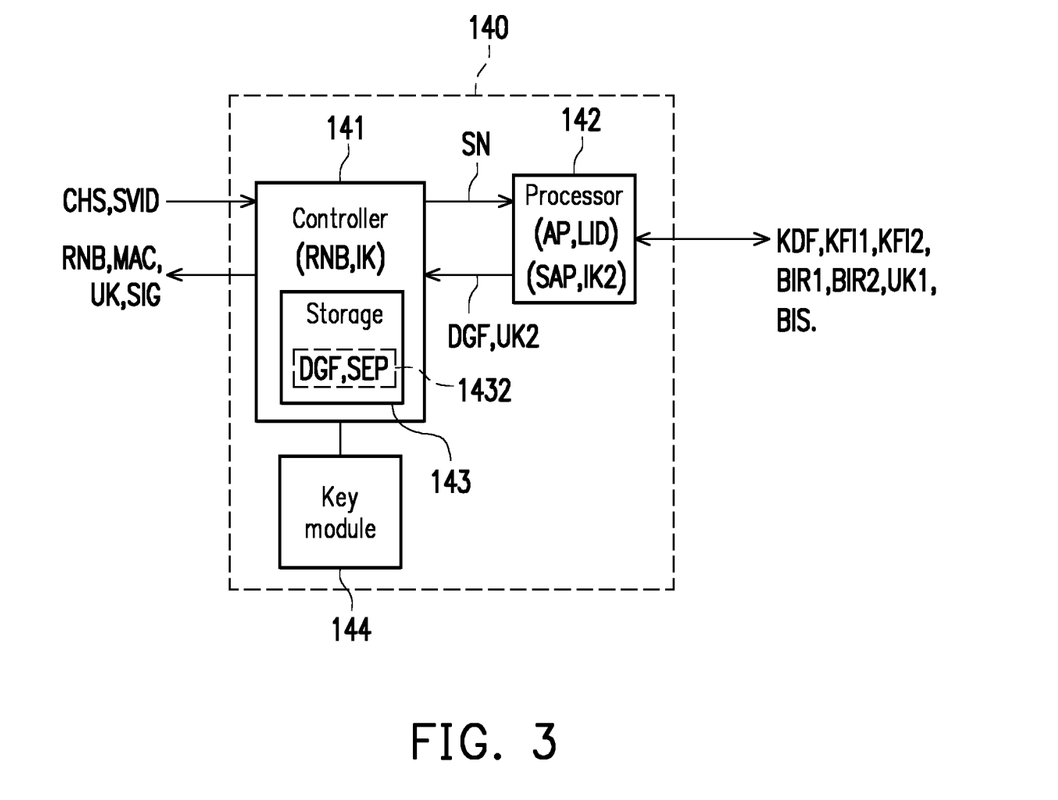
FIG. 3 is a schematic block diagram of an electronic device according to an embodiment of the disclosure.

FIG. 3 is a schematic block diagram of an electronic device according to an embodiment of the disclosure. Referring to FIG. 3, the electronic device 140 may include a controller 141, a processor 142, and a key module 144, but the disclosure is not limited thereto. The controller 141 may include a storage 143 and have an identification code SN. The key module 144 is coupled to the controller 141 and is controlled by the controller 141. The processor 142 is coupled to the controller 141. The processor 142 can execute the application program AP and perform steps S210 and S220 of FIG. 2 through the application program AP, and the controller 141 can perform steps S240 and S250 of FIG. 2 through its firmware.

In an embodiment of the disclosure, the processor 142 may be, for example, a central processing unit (CPU), but the disclosure is not limited thereto.

In an embodiment of the disclosure, the controller 141 may be, for example, a microcontroller, but the disclosure is not limited thereto.

In an embodiment of the disclosure, the storage 143 may be, for example, a serial peripheral interface (SPI) flash memory, but the disclosure is not limited thereto.

In an embodiment of the disclosure, the electronic device 140 may further include a communication module. The communication module is coupled to the controller 141. The controller 141 can communicate with the server device 900 through the communication module.

Figure 4:
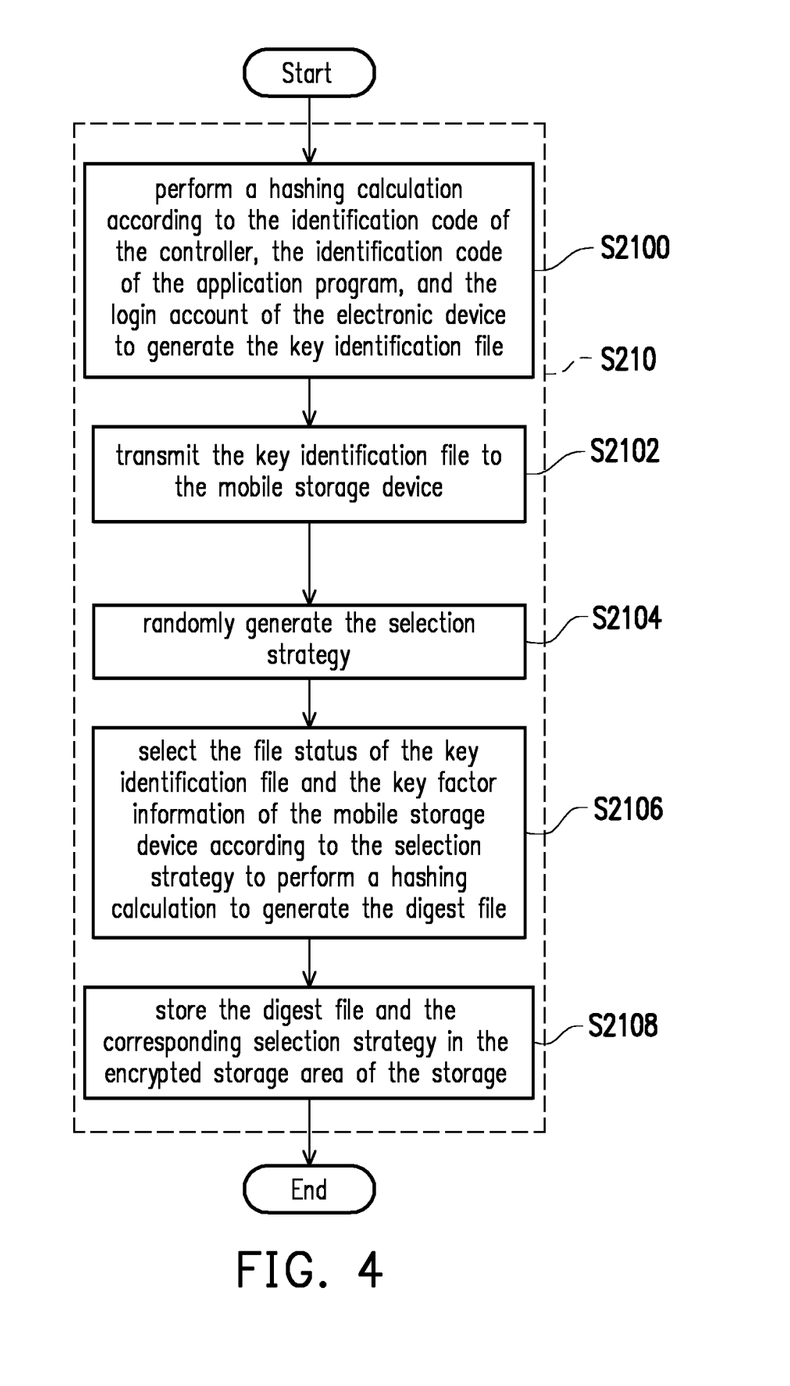
FIG. 4 is a detailed flowchart of step S210 in FIG. 2 according to an embodiment of the disclosure.

FIG. 4 is a detailed flowchart of step S210 (i.e., binding phase) in FIG. 2 according to an embodiment of the disclosure. Please refer to FIG. 1, FIG. 3 and FIG. 4 together, wherein the key factor information KFI0 of the electronic device 140 may include the identification code SN of the controller 141, the identification code AP of the above-mentioned application program, and the login account LID of the electronic device 140, but the disclosure is not limited thereto. As shown in FIG. 4, step S210 may include detailed steps S2100, S2102, S2104, S2106, and S2108. First, in step S2100, the application program AP of the processor 142 may perform a hashing calculation according to the identification code SN of the controller 141, the identification code SAP of the application program AP, and the login account LID of the electronic device 140 to generate the key identification file KDF. Then, in step S2102, the application program AP of the processor 142 can transmit the key identification file KDF to the mobile storage device 120.

In an embodiment of the disclosure, the identification code SN of the controller 141 may be, for example, the manufacturing number of the controller 141, which is for read-only and unique to identify the controller 141, but the disclosure is not limited thereto. In an embodiment of the disclosure, the identification code SAP of the application program AP may be, for example, a globally unique identifier (GUID), but the disclosure is not limited thereto. In an embodiment of the disclosure, the login account LID of the electronic device 140 may be, for example, the login account of the operating system of the electronic device 140, but the disclosure is not limited thereto.

Since the key identification file KDF in the mobile storage device 120 is related to the identification code SN of the controller 141, the identification code SAP of the application program AP and the login account LID of the electronic device 140, even if the mobile storage device 120 is stolen, the key identification file KDF in the mobile storage device 120 cannot be used on other electronic devices. For the reason that the controller identification codes and application program identification codes of other electronic devices are different from the controller identification code SN and the identification code SAP of the application program AP of the original electronic device 140, and the login accounts of other electronic devices might be different from the login account LID of the original electronic device 140, the key identification file KDF in the mobile storage device 120 will be deemed invalid in other electronic devices. In this way, the security of the authentication system 100 can be improved.

In addition, in step S2104, the application program AP of the processor 142 may randomly generate the selection strategy SEP. Then, in step S2106, the application program AP of the processor 142 can select at least one of the file status of the key identification file KDF and the key factor information KFI1 of the mobile storage device 120 according to the selection strategy SEP to perform a hashing calculation to generate the digest file DGF. Thereafter, in step S2108, the processor 142 may store the digest file DGF and the corresponding selection strategy SEP in the digest table in the encrypted storage area 1432 of the storage 143.

Furthermore, the file status of the key identification file KDF may include at least one of the establishing date, modification date, access date, starting position of the file cluster, and the number of file clusters of the key identification file KDF. In addition, the key factor information KFI1 of the mobile storage device 120 may include at least one of a supplier identification code of the mobile storage device 120, a product identification code of the mobile storage device 120, and a remaining storage space size of the mobile storage device 120.

For example, if the selection strategy SEP randomly generated by the application program AP of the processor 142 is the establishing date of the key identification file KDF, the remaining storage space size of the mobile storage device 120, and the number of file clusters of the key identification file KDF, the application program AP of the processor 142 will select the establishing date of the key identification file KDF, the remaining storage space size of the mobile storage device 120, and the number of file clusters of the key identification file KDF to perform a hashing calculation to generate the digest file DGF, and store the digest file DGF and the corresponding selection strategy SEP in the encrypted storage area 1432 of the storage 143.

It can be understood that, since the selection strategy SEP configured to generate the digest file DGF is randomly generated by the application program AP of the processor 142, and the digest file DGF generated by the processor 142 and the selection strategy SEP of the digest file DGF are stored in the encrypted storage area 1432, others can neither acquire the content of the digest file DGF corresponding to the key identification file KDF, nor acquire how the digest file DGF is generated (because the selection strategy SEP of the digest file DGF cannot be acquired). In this manner, it is possible to prevent the digest file DGF from being copied by others. In addition, even if the key identification file KDF is stolen and copied to another mobile storage device, the establishing date, modification date, access date, and starting position of the file cluster of the copied key identification file are different from those of the original key identification file, and the supplier ID, product ID, and remaining storage space size of the other mobile storage device and the original mobile storage device may not be completely the same. Therefore, in the checking phase, the application program AP of the processor 142 can verify that the copied key identification file is invalid according to the digest file DGF and the selection strategy SEP. In this way, the security of the authentication system 100 can be improved.

Additionally, the mobile storage device 120 can be bound to a plurality of different electronic devices, therefore, one or more key identification files can be stored in the mobile storage device 120, wherein these key identification files respectively correspond to different electronic devices, or different login accounts, or different electronic devices and different login accounts. Similarly, the electronic device 140 can be bound to multiple different mobile storage devices. Therefore, the number of combinations of digest files and selection strategies thereof stored in the encrypted storage area 1432 can be one or more, and the digest files respectively correspond to different key identification files.

Figure 5:
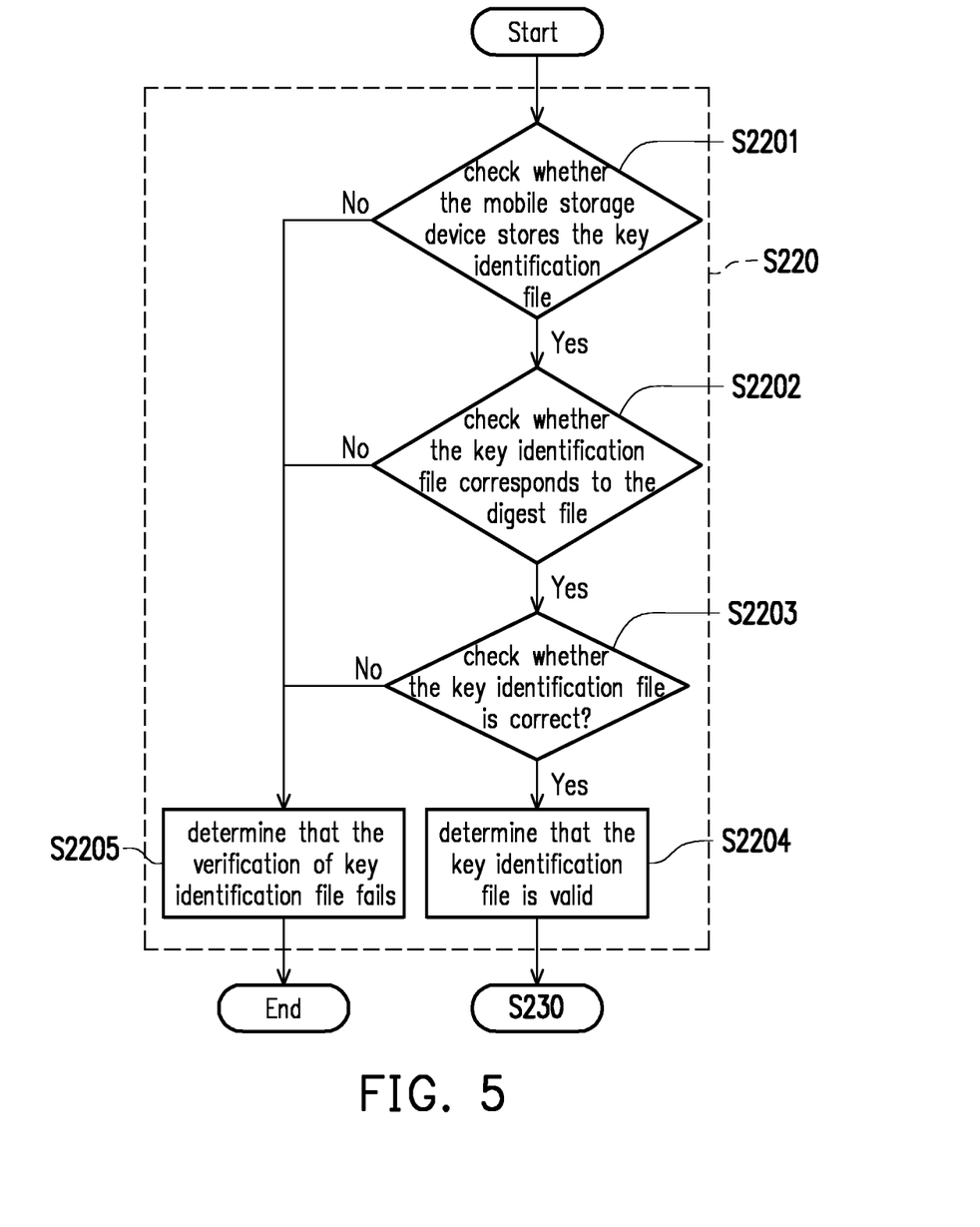
FIG. 5 is a detailed flowchart of step S220 in FIG. 2 according to an embodiment of the disclosure.

FIG. 5 is a detailed flowchart of step S220 (i.e., checking phase) in FIG. 2 according to an embodiment of the disclosure. Please refer to FIG. 1, FIG. 3 and FIG. 5 together. As shown in FIG. 5, when the electronic device 140 is plugged into the mobile storage device 120, step S220 includes detailed steps S2201 to S2205. First, in step S2201, the application program AP of the processor 142 checks whether the mobile storage device 120 stores the key identification file KDF. In an embodiment of the disclosure, the application program AP of the processor 142 can determine whether the file is the key identification file KDF according to the file name or filename extension of the file stored in the mobile storage device 120, but the disclosure is not limited thereto. If the checking result in step S2201 is negative, it means that the key identification file KDF is not stored in the mobile storage device 120, the application program AP of the processor 142 determines that the verification fails, as shown in step S2205, and ends the checking process. If the checking result in step S2201 is positive, it means that the key identification file KDF is stored in the mobile storage device 120, then step S2202 is performed.

In step S2202, the application program AP of the processor 142 may check whether the key identification file KDF corresponds to the digest file DGF according to the selection strategy SEP of the digest file DGF in the encrypted storage area 1432. If the checking result of step S2202 is negative, it means that the key identification file KDF in the mobile storage device 120 does not correspond to the digest file DGF in the encrypted storage area 1432, then the processor 142 determines that the checking process fails, that is, the controller 141 does not correspond to the binding device, as shown in step S2205, and ends the checking process. If the checking result of step S2302 is positive, it means that the key identification file KDF in the mobile storage device 120 corresponds to the digest file DGF in the encrypted storage area 1432, that is, the controller 141 corresponds to the binding device, and then step S2203 is performed.

For example, assume that the mobile storage device 120 stores the key identification file KDF, and the encrypted storage area 1432 stores a first digest file and its first selection strategy and a second digest file and its second selection strategy. First, the application program AP of the processor 142 may select at least one of the file status of the key identification file KDF and the key factor information KFI1 of the mobile storage device 120 according to the first selection strategy in the encrypted storage area 1432 to perform a hashing calculation to generate a first comparison file, and determine whether the first comparison file is the same as the first digest file. If the first comparison file is the same as the first digest file, it means that the key identification file KDF in the mobile storage device 120 corresponds to the first digest file in the encrypted storage area 1432, and step S2203 is performed.

If the first comparison file is different from the first digest file, it means that the key identification file KDF in the mobile storage device 120 does not correspond to the first digest file in the encrypted storage area 1432, then the processor 142 may then select at least one of the file status of the key identification file KDF and the key factor information KFI1 of the mobile storage device 120 according to the second selection strategy in the encrypted storage area 1432 to perform a hashing calculation to generate a second comparison file, and determine whether the second comparison file is the same as the second digest file.

If the second comparison file is the same as the second digest file, it means that the key identification file KDF in the mobile storage device 120 corresponds to the second digest file in the encrypted storage area 1432, then step S2203 is performed. If the second comparison file is different from the second digest file, it means that the key identification file KDF in the mobile storage device 120 does not correspond to the first digest file and the second digest file in the encrypted storage area 1432, then the application program AP of the processor 142 determines that the checking process fails (i.e., the key identification file KDF is invalid), as shown in step S2205, and ends the checking process.

In step S2203, the application program AP of the processor 142 may perform a hashing calculation based on the identification code SN of the controller 141, the identification code SAP of the application program AP, and the login account LID of the electronic device 140 to check whether the key identification file KDF is correct. If the checking result of step S2203 is negative, then the application program AP of the processor 142 determines that the checking process fails (that is, the key identification file KDF is invalid), as shown in step S2205, and ends the checking process. If the checking result of step S2203 is positive, then the processor 142 determines that the key identification file KDF is valid, as shown in step S2204, and proceeds to step S230.

Figure 6:
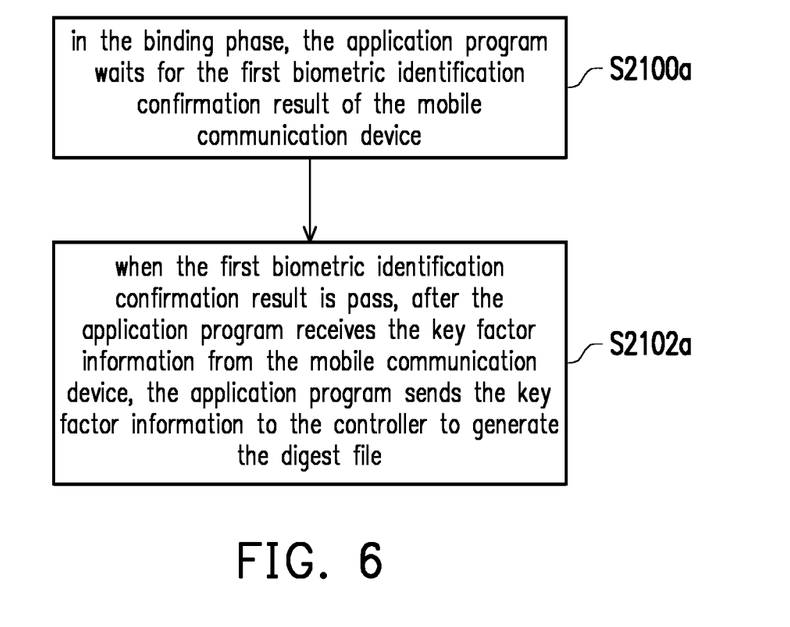
FIG. 6 is a detailed flowchart of step S210 in FIG. 2 according to another embodiment of the disclosure.

FIG. 6 is a detailed flowchart of step S210 in FIG. 2 according to another embodiment of the disclosure. Please refer to FIG. 1, FIG. 3 and FIG. 6 together. As shown in FIG. 6, when the electronic device 140 and the mobile communication device 130 are connected, step S210 includes detailed steps S2100a and S2102a. On this occasion, the electronic device 140 and the mobile communication device 130 perform asymmetric authentication and asymmetric encrypted transmission. First, in step S2100a, in the binding phase, the application program AP of the processor 142 waits for the first biometric identification confirmation result BIR1 of the mobile communication device 130. In step S2102a, when the first biometric identification confirmation result BIR1 is pass, after the application program AP of the processor 142 receives the key factor information KFI2 from the mobile communication device 130, the application program AP sends the key factor information KFI2 to the controller 141 to generate the digest file DFG.

Figure 7:
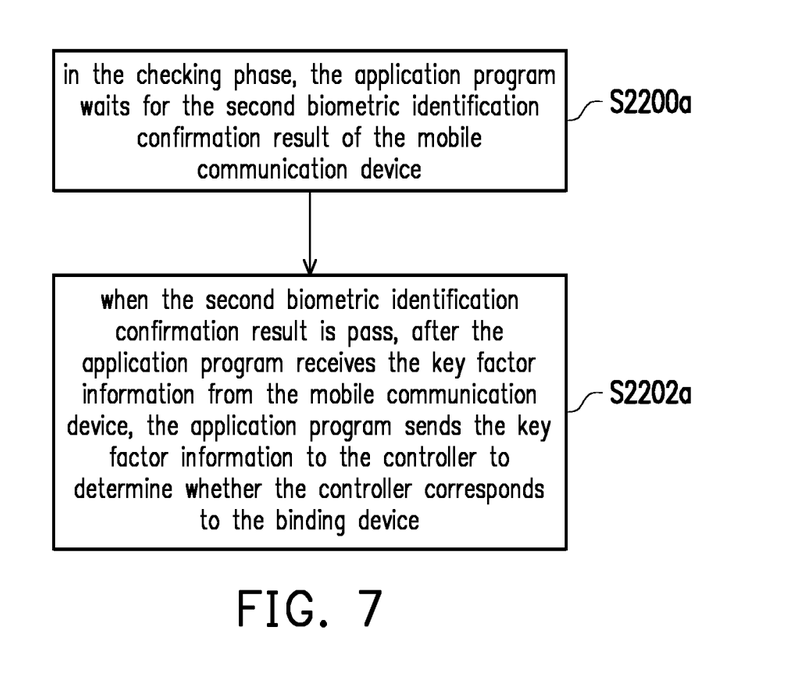
FIG. 7 is a detailed flowchart of step S220 in FIG. 2 according to another embodiment of the disclosure.

FIG. 7 is a detailed flowchart of step S220 in FIG. 2 according to another embodiment of the disclosure. Please refer to FIG. 1, FIG. 3 and FIG. 7 together. As shown in FIG. 7, when the electronic device 140 is connected to the mobile communication device 130, step S220 includes detailed steps S2200a and S2202a. On this occasion, the electronic device 140 and the mobile communication device 130 perform asymmetric authentication and symmetric encrypted transmission. First, in step S2200a, in the checking phase, the application program AP of the processor 142 waits for the second biometric identification confirmation result BIR2 of the mobile communication device 130. In step S2202a, when the second biometric identification confirmation result BIR2 is pass, after the application program AP of the processor 142 receives the key factor information KFI2 from the mobile communication device 130, the application program AP sends the key factor information KFI2 to the controller 141 to determine whether the controller 141 corresponds to the binding device.

In the embodiment of the disclosure, while the application program AP of the processor 142 is waiting for the first biometric identification confirmation result BIR1 or the second biometric identification confirmation result BIR2 of the mobile communication device 130, the mobile communication device 130 generates the first public key UK1 and the first private key IK1, and the application program AP of the processor 142 requests for the first public key UK1, a biometric identification status BIS, and the key factor information KFI2 from the mobile communication device 130, wherein the application program AP stores the first public key UK1. Before the application program AP of the processor 142 transmits the key factor information KFI2 to the controller 141, the application program AP of the processor 142 generates the second public key UK2 and the second private key IK2, and the second public key UK2 is transmitted to the controller 141, so that the controller 141 stores the second public key UK2.

Figure 8:
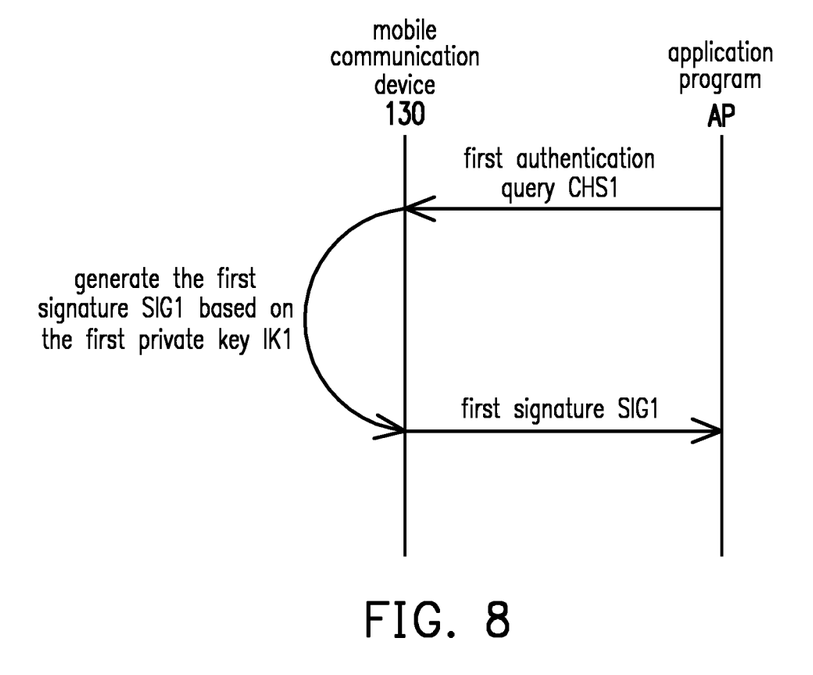
FIG. 8 is a detailed flowchart showing steps of authenticating mobile communication device by an application program according to an embodiment of the disclosure.

FIG. 8 is a detailed flowchart showing steps of authenticating mobile communication device by an application program according to an embodiment of the disclosure. Please refer to FIG. 1, FIG. 3 and FIG. 8 together. As shown in FIG. 8, when the application program AP of the processor 142 authenticates the mobile communication device 130, the mobile communication device 130 obtains the first authentication query CHS1 of the application program AP from the processor 142, and the mobile communication device 130 generates the first signature SIG1 based on the first private key IK1 in response to the first authentication query CHS1, and the mobile communication device 130 returns the first signature SIG1 to the application program AP of the processor 142. The application program AP of the processor 142 verifies whether the first signature SIG1 is correct through the first public key UK1 transmitted by the mobile communication device 130, thereby authenticating the mobile communication device 130.

Figure 9:
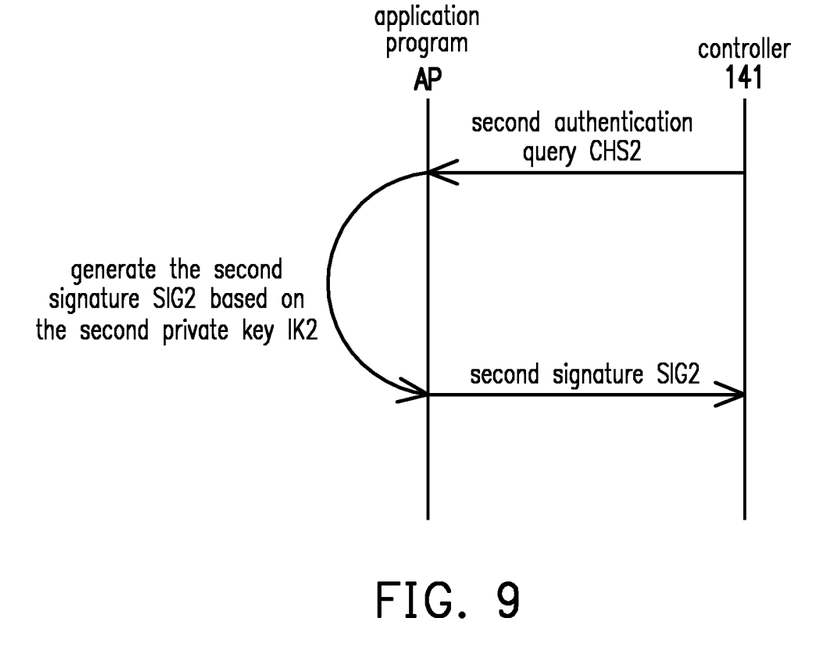
FIG. 9 is a detailed flowchart showing steps of authenticating an application program by a controller according to an embodiment of the disclosure.

FIG. 9 is a detailed flowchart showing steps of authenticating an application program by a controller according to an embodiment of the disclosure. Please refer to FIG. 1, FIG. 3 and FIG. 9 together. As shown in FIG. 9, when the controller 141 authenticates the application program AP of the processor 142, the application program AP of the processor 142 obtains the second authentication query CHS2 from the controller 141, and the application program AP of the processor 142 generates the second signature SIG2 based on the second private key IK2 in response to the second authentication query CHS2, and the application program AP of the processor 142 returns the second signature SIG2 to the controller 141. The controller 141 verifies whether the second signature SIG2 is correct through the second public key UK2 transmitted by the application program AP of the processor 142, thereby authenticating the application program AP of the processor 142.

In an embodiment of the disclosure, the electronic device 140 may enable the authentication of U2F without being connected to an external electronic device. When the electronic device 140 is not connected to an external electronic device, in the binding phase, that is, in step S210, the application program AP of the processor 142 generates the digest file DGF according to the key factor information KFI0 and the selection strategy SEP of the electronic device 140. In the checking phase, that is, step S220, the application program AP of the processor 142 determines whether the controller 141 corresponds to the binding device based on the digest file DGF and the key factor information KFI0 of the electronic device 140.

Figure 10:
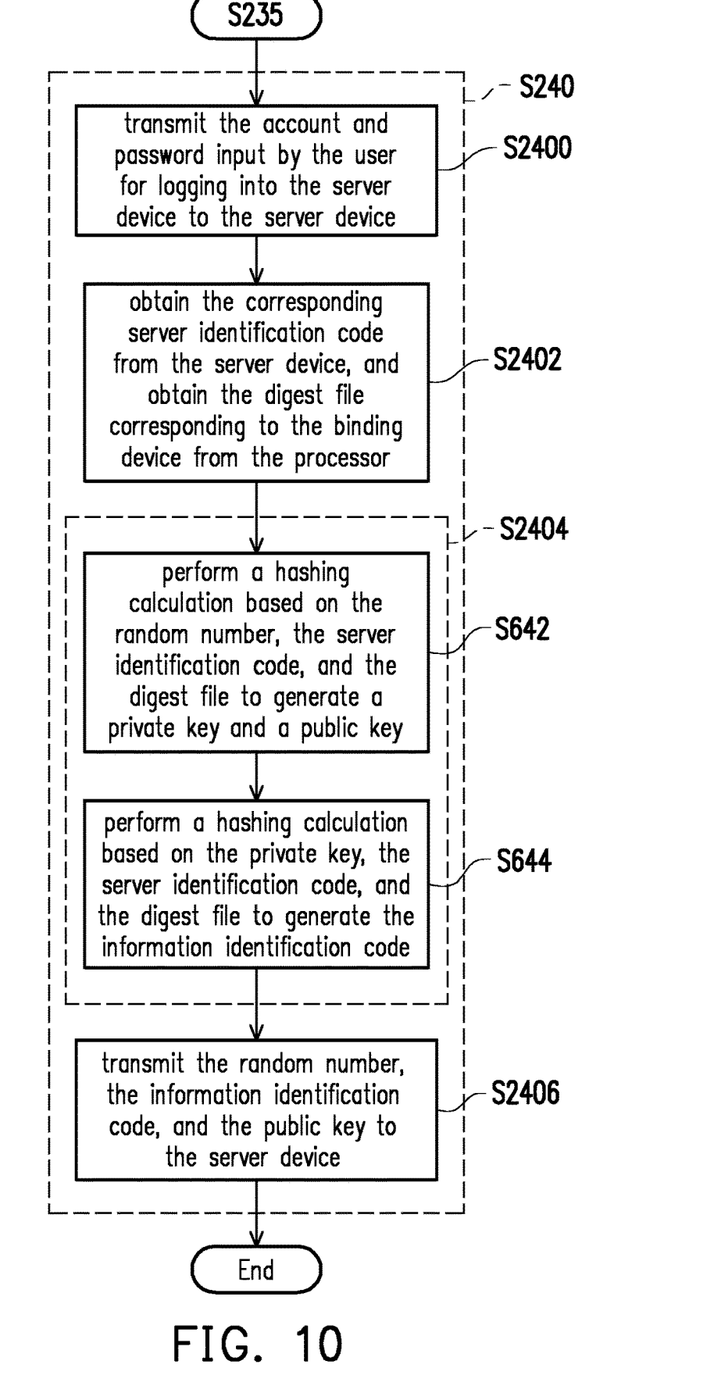
FIG. 10 is a detailed flowchart of step S240 in FIG. 2 according to an embodiment of the disclosure.

FIG. 10 is a detailed flowchart of step S240 (i.e., registration phase) in FIG. 2 according to an embodiment of the disclosure. Please refer to FIG. 1, FIG. 3 and FIG. 10 together. As shown in FIG. 10, step S240 includes detailed steps S2400, S2402, S2404, and S2406. First, in step S2400, the controller 141 may transmit the account and password input by the user for logging into the server device 900 to the server device 900. Then, in step S2402, the controller 141 can obtain the corresponding server identification code SVID from the server device 900, and the controller 141 can obtain the digest file DGF corresponding to the binding device from the processor 142. Thereafter, in step S2404, the controller 141 performs a hashing calculation based on the random number RNB, the server identification code SVID, and the digest file DGF to generate an information identification code MAC and a public key UK.

In detail, step S2404 may include detailed steps S642 and S644. First, in step S642, the controller 141 may perform a hashing calculation based on the random number RNB, the server identification code SVID, and the digest file DGF to generate a private key IK and a public key UK. Then, in step S644, the controller 141 may perform a hashing calculation based on the private key IK, the server identification code SVID, and the digest file DGF to generate the information identification code MAC.

Thereafter, in step S2406, the controller 141 may transmit the random number RNB, the information identification code MAC, and the public key UK to the server device 900 to register with the server device 900 for the U2F service. In this way, the server device 900 can correspond the account and password used to log into the server device 900 to the public key UK, thereby completing the registration.

In an embodiment of the disclosure, the above-mentioned hashing calculation can be performed by using an existing hash algorithm, such as a secure hash algorithm (SHA), etc., but the disclosure is not limited thereto, and it depends on the actual application or design requirements.

Figure 11:
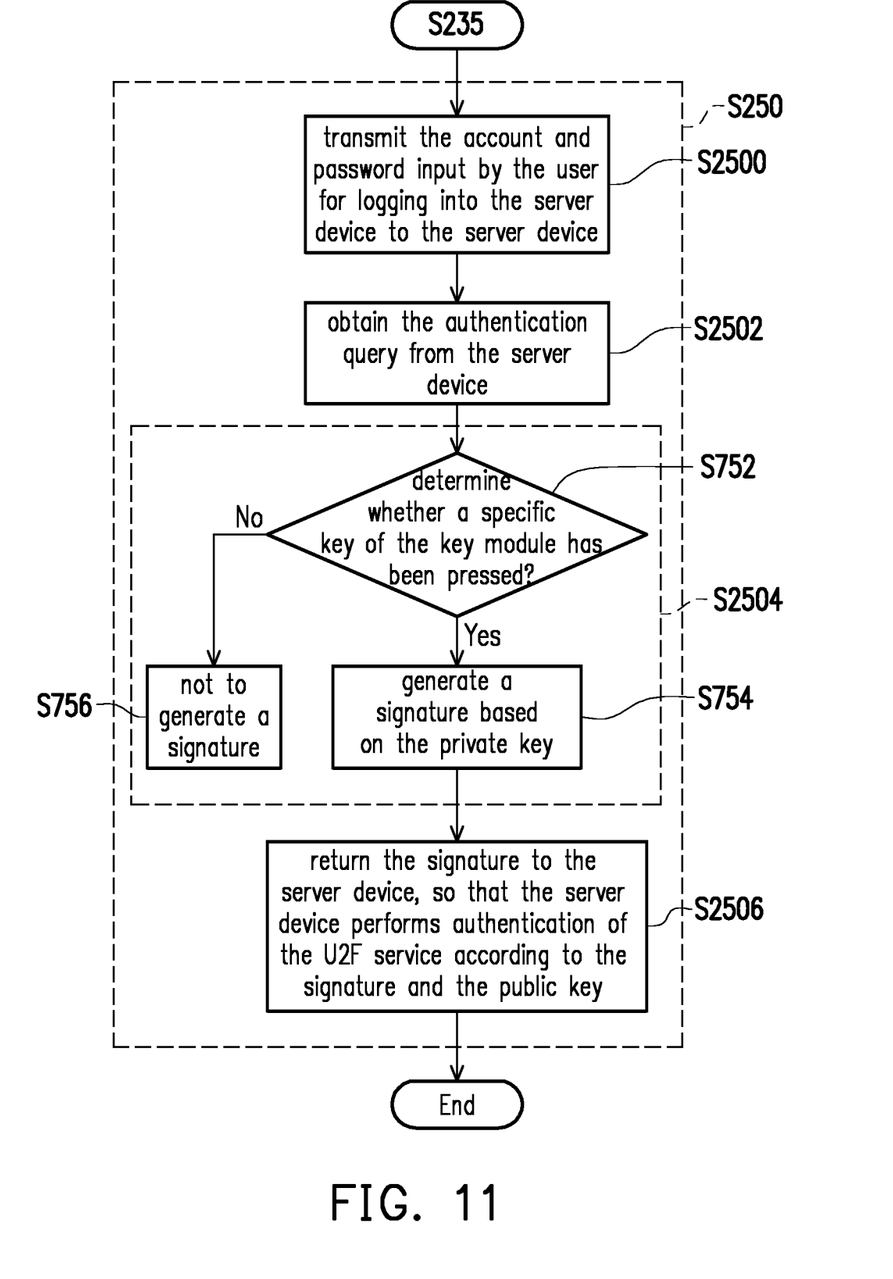
FIG. 11 is a detailed flowchart of step S250 in FIG. 2 according to an embodiment of the disclosure.

FIG. 11 is a detailed flowchart of step S250 (i.e., authentication phase) in FIG. 2 according to an embodiment of the disclosure. Please refer to FIG. 1, FIG. 3 and FIG. 11 together. As shown in FIG. 11, step S250 includes detailed steps S2500, S2502, S2504, and S2506. First, in step S2500, the controller 141 can transmit the account and password input by the user for logging into the server device 900 to the server device 900, so that the server device 900 can search for the corresponding public key UK according to the above account and password and transmit the authentication query CHS. Then, in step S2502, the controller 141 can obtain the authentication query CHS from the server device 900. Next, in step S2504, the controller 141 may generate a signature SIG based on the private key IK in response to the authentication query CHS.

In an embodiment of the disclosure, step S2504 may include detailed steps S752, S754 and S756. First, in step S752, the controller 141 can determine whether a specific key of the key module 144 of the electronic device 140 has been pressed. If the determining result in step S752 is negative, it means that the user may not be present around the electronic device 140 or the user is not using the electronic device 140; then in step S756, the controller 141 will not generate a signature SIG If the determining result in step S752 is positive, it means that the user is indeed present around the electronic device 140 and is using the electronic device 140, then the controller 141 generates a signature SIG based on the private key IK in response to the authentication query CHS, as shown in step S754. In an embodiment of the disclosure, if the controller 141 does not return the signature SIG to the server device 900 within a specific time interval, the account and password used for logging into the server device 900 will not pass the authentication of the U2F protocol of the server device 900, and the server device 900 will send a message indicating that the U2F authentication fails to the electronic device 140.

After that, in step S2506, the controller 141 returns the signature SIG to the server device 900, so that the server device 900 performs authentication of the U2F service according to the signature SIG and the public key UK (that is, the public key corresponding to the above account and the password for logging into the server device 900). In detail, the server device 900 can verify whether the signature SIG is valid based on the public key UK. If the server device 900 verifies that the signature SIG is valid, the account and password used for logging into the server device 900 can pass the authentication of the U2F protocol of the server device 900, so the user can start using the online service provided by the server device 900.

According to the above, when the electronic device 140 is plugged into the mobile storage device 120, the controller 141 verifies the application program AP of the processor 142. After the application program AP passes the verification, the controller 141 then verify the mobile storage device 120. After the mobile storage device 120 passes the verification, the controller 141 will enable the authentication operation of the U2F service. When the electronic device 140 is connected to the mobile communication device 130, the application program AP of the processor 142 will verify the mobile communication device 130. After the mobile communication device 130 passes the verification, the controller 141 then verify the application program AP of the processor 142. After the application program AP passes the verification, the controller 141 then verify the mobile communication device 130 again. After the mobile communication device 130 passes the verification, the controller 141 will enable the authentication operation of the U2F service.

In summary, the authentication system and the authentication method provided in the embodiments of the disclosure allow the user to use the authentication of the U2F protocol supported by the server device to improve the security of using the service provided by the server device.

In addition, since the mobile storage device/mobile communication device in the authentication system provided by the embodiments of the disclosure may be any type of existing portable storage device/portable communication device, and the authentication method may be implemented by the processor and the controller in the electronic device through the application program and firmware respectively, the user does not need to additionally purchase a physical key device specially designed and manufactured in compliance with the U2F protocol. In this way, the cost of using authentication of the U2F protocol can be effectively reduced, thereby increasing the user's willingness to use.

Although the disclosure has been disclosed in the above embodiments, it is not intended to limit the disclosure, and those skilled in the art can make some modifications and refinements without departing from the spirit and scope of the disclosure. Therefore, the scope of the disclosure is subject to the definition of the scope of the appended claims.

What is claimed is:

1. An authentication system, comprising:
   an electronic device, comprising:
      a controller having a digest table;
      a processor coupled to the controller, and configured to execute an application program; and
      a key module coupled to the controller, and controlled by the controller, the key module is built in the electronic device,
   wherein in a binding phase, the application program generates a digest file based on key factor information and a selection strategy, and stores the digest file and the selection strategy in the digest table,
   wherein in a checking phase, the application program determines whether the controller corresponds to a binding device based on the digest file and the key factor information,
   when the controller corresponds to the binding device, the controller performs an authentication operation of a Universal 2nd Factor (U2F) service with a server device according to the digest file corresponding to the binding device in response to a pressing of the key module,
   wherein during the electronic device is plugged into a mobile storage device, in the binding phase, the application program performs a hashing calculation based on the key factor information of the electronic device to generate a key identification file, and transmits the key identification file to the mobile storage device, and the application program generates the selection strategy randomly, and selects at least one of a file status of the key identification file and the key factor information of the mobile storage device according to the selection strategy to perform the hashing calculation to generate the digest file.

2. The authentication system according to claim 1, wherein if the controller corresponds to the binding device, at a registration phase, the controller registers with the server device for the U2F service according to the digest file.

3. The authentication system according to claim 1, wherein the key factor information of the electronic device comprises an identification code of the controller, an identification code of an application program, and a login account of the electronic device, and the file status comprises at least one of an establishing date, a modification date, an access date, a starting position of a file cluster, and the number of the file cluster of the key identification file, and the key factor information of the mobile storage device comprises at least one of a supplier identification code, a product identification code, and a remaining storage space size of the mobile storage device.

4. The authentication system according to claim 3, wherein at the checking phase:
   the application program checks whether the mobile storage device stores the key identification file to obtain a first result,
   if the first result is yes, the application program checks whether the key identification file corresponds to the digest file according to the selection strategy to obtain a second result,
   if the second result is yes, the application program performs the hashing calculation based on the identification code of the controller, the identification code of the application program, and the login account of the electronic device to verify whether the key identification file is correct to obtain a third result,
   if the third result is yes, the application program determines that the controller corresponds to the binding device.

5. The authentication system according to claim 1, wherein during the electronic device is connected to a mobile communication device, at the binding phase, the application program waits for a first biometric identification confirmation result of the mobile communication device, and
   when the first biometric identification confirmation result is pass, the application program receives the key factor information from the mobile communication device, and then transmits the key factor information to the controller to generate the digest file.

6. The authentication system according to claim 5, wherein at the checking phase, the application program waits for a second biometric identification confirmation result of the mobile communication device, and
   when the second biometric identification confirmation result is pass, after the application program receives the key factor information from the mobile communication device, the application program transmits the key factor information to the controller to determine whether the controller corresponds to the binding device.

7. The authentication system according to claim 6, wherein while the application program is waiting for the first biometric identification confirmation result or the second biometric identification confirmation result of the mobile communication device, the mobile communication device generates a first public key and a first private key, and the application program requests for the first public key, a biometric identification status, and the key factor information from the mobile communication device, wherein the application program stores the first public key,
   wherein before the application program transmits the key factor information to the controller, the application program generates a second public key and a second private key, and the second public key is transmitted to the controller, so that the controller stores the second public key.

8. The authentication system according to claim 7, wherein when the application program authenticates the mobile communication device, the mobile communication device obtains a first authentication query from the application program, and the mobile communication device generates a first signature based on the first private key in response to the first authentication query, and the mobile communication device returns the first signature to the application program.

9. The authentication system according to claim 7, wherein when the controller authenticates the application program, the application program obtains a second authentication query from the controller, and the application program generates a second signature based on the second private key in response to the second authentication query, and the application program returns the second signature to the controller.

10. The authentication system according to claim 1, wherein during the electronic device is not connected to an external electronic device, at the binding phase, the application program generates the digest file using the key factor information and the selection strategy of the electronic device,
wherein at the checking phase, the application program determines whether the controller corresponds to the binding device using the digest file and the key factor information of the electronic device.

11. The authentication system according to claim 10, wherein the key factor information of the electronic device comprises an identification code of the controller, an identification code of an application program, and a login account of the electronic device.

12. The authentication system according to claim 2, wherein at the registration phase:
the controller transmits an account and a password used for logging into the server device to the server device, the controller obtains a server identification code and the digest file from the server device and the processor respectively, the controller performs a hashing calculation according to a random number, the server identification code and the digest file to generate an information identification code and a public key, and the controller transmits the random number, the information identification code and the public key to the server device to register with the server device for the U2F service.

13. The authentication system according to claim 12, wherein at the registration phase, the controller performs the hashing calculation based on the random number, the server identification code, and the digest file to generate a private key and the public key, and the controller performs the hashing calculation according to the private key, the server identification code, and the digest file to generate the information identification code.

14. The authentication system according to claim 13, wherein at the authentication phase:
the controller transmits the account and the password used for logging into the server device to the server device, the controller obtains an authentication query from the server device, and the controller generates a signature according to the private key in response to the authentication query, and the controller returns the signature to the server device, so that the server device performs the authentication of the U2F service based on the signature and the public key.

15. The authentication system according to claim 13, wherein at the authentication phase, the controller determines whether a key of the key module is pressed to obtain a determining result, and if the determining result is positive, the controller generates the signature based on the private key in response to the authentication query.

16. The authentication system according to claim 1, wherein the controller has a storage for storing the digest table.

17. An authentication method, comprising:
in a binding phase, generating a digest file according to key factor information and a selection strategy by an application program executed by a processor of an electronic device, and storing the digest file in a digest table of a controller of the electronic device;
in a checking phase, determining whether the controller corresponds to a binding device based on the digest file and the key factor information by the application program of the electronic device; and
if the controller corresponds to the binding device, then in an authentication phase, the controller performs an authentication operation of a U2F service with a server device according to the digest file corresponding to the binding device in response to a pressing of a key module of the electronic device, wherein the key module is built in the electronic device,
wherein the electronic device is plugged into a mobile storage device, and the step of generating the digest file according to the key factor information and the selection strategy comprises:
generating a key identification file by the application program by performing a hashing calculation based on the key factor information of the electronic device;
generating the selection strategy randomly by the application program; and
selecting at least one of a file status of the key identification file and the key factor information of the mobile storage device according to the selection strategy by the application program to perform the hashing calculation to generate the digest file.

18. The authentication method according to claim 17, further comprising:
if the controller corresponds to the binding device, then at a registration phase, the controller registers with the server device for the U2F service according to the digest file.

19. The authentication method according to claim 17, wherein the key factor information of the electronic device comprises an identification code of the controller, an identification code of the application program, and a login account of the electronic device, and the file status comprises at least one of an establishing date, a modification date, an access date, a starting position of a file cluster, and the number of the file cluster of the key identification file, and the key factor information of the mobile storage device comprises at least one of a supplier identification code, a product identification code, and a remaining storage space size of the mobile storage device.

20. The authentication method according to claim 19, wherein the step of checking whether the controller corresponds to the binding device based on the digest file and the key factor information of the electronic device comprises:
checking whether the mobile storage device stores the key identification file by the application program to obtain a first result;
if the first result is yes, checking whether the key identification file corresponds to the digest file according to the selection strategy by the application program to obtain a second result;
if the second result is yes, performing the hashing calculation by the application program according to the identification code of the controller, the identification code of the application program, and the login account of the electronic device to verify whether the key identification file is correct to obtain a third result; and if the third result is yes, determining by the application program that the controller corresponds to the binding device.

21. The authentication method according to claim 17, wherein the electronic device is connected to a mobile communication device, and the authentication method further comprises:
in the binding phase, the application program waits for a first biometric identification confirmation result of the mobile communication device; and
when the first biometric identification confirmation result is pass, after the application program receives the key factor information from the mobile communication device, the application program transmits the key factor information to the controller to generate the digest file.

22. The authentication method according to claim 21, further comprising:
in the checking phase, the application program waits for a second biometric identification confirmation result of the mobile communication device; and
when the second biometric identification confirmation result is pass, after the application program receives the key factor information from the mobile communication device, the application program transmits the key factor information to the controller to determine whether the controller corresponds to the binding device.

23. The authentication method according to claim 22, further comprising:
while the application program is waiting for the first biometric identification confirmation result or the second biometric identification confirmation result of the mobile communication device, the mobile communication device generates a first public key and a first private key, and the application program requests for the first public key, a biometric identification status, and the key factor information from the mobile communication device, wherein the application program stores the first public key, and
before the application program transmits the key factor information to the controller, the application program generates a second public key and a second private key, and the second public key is transmitted to the controller, so that the controller stores the second public key.

24. The authentication method according to claim 23, further comprising:
when the application program authenticates the mobile communication device, the mobile communication device obtains a first authentication query from the application program; and
the mobile communication device generates a first signature based on the first private key in response to the first authentication query, and the mobile communication device returns the first signature to the application program.

25. The authentication method according to claim 23, further comprising:
when the controller authenticates the application program, the application program obtains a second authentication query from the controller; and
the application program generates a second signature based on the second private key in response to the second authentication query, and the application program returns the second signature to the controller.

26. The authentication method according to claim 17, wherein the electronic device is not connected to an external electronic device, and the authentication method further comprises:
at the binding phase, the application program generates the digest file using the key factor information and the selection strategy of the electronic device; and
at the checking phase, the application program determines whether the controller corresponds to a binding device using the digest file and the key factor information of the electronic device.

27. The authentication method according to claim 26, wherein the key factor information of the electronic device comprises an identification code of the controller, an identification code of an application program, and a login account of the electronic device.

28. The authentication method according to claim 17, wherein the step of registering with the server device for the U2F service based on the digest file comprises:
transmits an account and a password used for logging into the server device to the server device by the controller;
obtaining a server identification code and the digest file from the server device and the processor respectively by the controller;
performing a hashing calculation according to a random number, the server identification code and the digest file by the controller to generate an information identification code and a public key; and
transmitting the random number, the information identification code and the public key to the server device by the controller to register with the server device for the U2F service.

29. The authentication method according to claim 28, wherein the step of performing the hashing calculation according to the random number, the server identification code and the digest file to generate the information identification code and the public key comprises:
performing the hash calculation based on the random number, the server identification code and the digest file by the controller to generate a private key and the public key; and
performing the hash calculation based on the private key, the server identification code, and the digest file by the controller to generate the information identification code.

30. The authentication method according to claim 29, wherein the step of performing the authentication operation of the U2F service with the server device based on the digest file corresponding to the key identification file comprises:
transmitting the account and the password used for logging into the server device to the server device by the controller;
obtaining an authentication query from the server device by the controller;
generating a signature based on the private key in response to the authentication query by the controller; and
returning the signature to the server device by the controller, such that the server device performs the authentication of the U2F service based on the signature and the public key.

31. The authentication method according to claim 30, wherein the step of generating the signature based on the private key in response to the authentication query by the controller comprises:
determining by the controller whether a key of the key module is pressed to obtain a determining result; and if the determining result is yes, generating the signature based on the private key in response to the authentication query by the controller.

\* \* \* \* \*